United States Patent [19]
Roth

[11] Patent Number: 5,899,053
[45] Date of Patent: May 4, 1999

[54] LAWN MOWER BLADE

[76] Inventor: Scott Alan Roth, 256 Penn St., Bath, Pa. 18014

[21] Appl. No.: 08/932,515

[22] Filed: Sep. 18, 1997

[51] Int. Cl.$^6$ ..................................................... A01D 34/73
[52] U.S. Cl. .............................................. 56/295; 56/255
[58] Field of Search ........................... 56/255, 295, 17.5, 56/DIG. 17, DIG. 20

[56] References Cited

U.S. PATENT DOCUMENTS

| | | | |
|---|---|---|---|
| Re. 35,393 | 12/1996 | Mohrman | ................................... 56/255 |
| 3,022,621 | 2/1962 | Zavarella . | |
| 3,214,896 | 11/1965 | Watkins et al. . | |
| 5,402,629 | 4/1995 | Masaru | ..................................... 56/294 |

Primary Examiner—Heather Shackelford

[57] ABSTRACT

A new lawn mower blade for improving the cutting edge to produce a more efficient cutting area. The inventive device includes an elongate blade member, a first scalloped cutting edge region on one end of the blade member, a second scalloped cutting edge region on the other end, a first deflecting fin on the opposite edge of the second scalloped cutting edge region, a second deflecting fin on the opposite edge of the first scalloped cutting edge region, and a mounting means for mounting the blade member to a lawnmower. The new lawn mower blade is designed to increase the surface area of the cutting edge to effectively cut grass cleaner and more even than a conventional rotary lawn mower blade.

17 Claims, 3 Drawing Sheets

LAWN MOWER BLADE

BACKGROUND OF THE INVENTION

1. Field of the Invention

The present invention relates to rotary lawn mower blades and more particularly pertains to a new lawn mower blade for improving the cutting edge to produce a more efficient cutting area.

2. Description of the Prior Art

The use of rotary lawn mower blades is known in the prior art. More specifically, rotary lawn mower blades heretofore devised and utilized are known to consist basically of familiar, expected and obvious structural configurations, notwithstanding the myriad of designs encompassed by the crowded prior art which have been developed for the fulfillment of countless objectives and requirements.

Known prior art rotary lawn mower blades include U. S. Pat. No. 5,321,940; U.S. Pat. No. 4,532,708; U.S. Pat. No. 347,150; U.S. Pat. No. 5,398,490; U.S. Pat. No. 5,442,902; and U.S. Pat. No. 4,429,518.

While these devices fulfill their respective, particular objectives and requirements, the aforementioned patents do not disclose a new lawn mower blade. The inventive device includes an elongate blade member, a first scalloped cutting edge region on one end of the blade member, a second scalloped cutting edge region on the other end, a first deflecting fin on the opposite edge of the second scalloped cutting edge region, a second deflecting fin on the opposite edge of the first scalloped cutting edge region, and a mounting means for mounting the blade member to a lawnmower.

In these respects, the lawn mower blade according to the present invention substantially departs from the conventional concepts and designs of the prior art, and in so doing provides an apparatus primarily developed for the purpose of improving the cutting edge to produce a more efficient cutting area.

SUMMARY OF THE INVENTION

In view of the foregoing disadvantages inherent in the known types of rotary lawn mower blades now present in the prior art, the present invention provides a new lawn mower blade construction wherein the same can be utilized for improving the cutting edge to produce a more efficient cutting area.

The general purpose of the present invention, which will be described subsequently in greater detail, is to provide a new lawn mower blade apparatus and method which has many of the advantages of the rotary lawn mower blades mentioned heretofore and many novel features that result in a new lawn mower blade which is not anticipated, rendered obvious, suggested, or even implied by any of the prior art rotary lawn mower blades, either alone or in any combination thereof.

To attain this, the present invention generally comprises an elongate blade member, a first scalloped cutting edge region on one end of the blade member, a second scalloped cutting edge region on the other end, a first deflecting fin on the opposite edge of the second scalloped cutting edge region, a second deflecting fin on the opposite edge of the first scalloped cutting edge region, and a mounting means for mounting the blade member to a lawnmower.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lawn mower blade apparatus and method which has many of the advantages of the rotary lawn mower blades mentioned heretofore and many novel features that result in a new lawn mower blade which is not anticipated, rendered obvious, suggested, or even implied by any of the prior art rotary lawn mower blades, either alone or in any combination thereof.

It is another object of the present invention to provide a new lawn mower blade, which may be easily and efficiently manufactured and marketed.

It is a further object of the present invention to provide a new lawn mower blade, which is of a durable and reliable construction.

An even further object of the present invention is to provide a new lawn mower blade which is susceptible of a low cost of manufacture with regard to both materials and labor, and which accordingly is then susceptible of low prices of sale to the consuming public, thereby making such lawn mower blade economically available to the buying public.

Still yet another object of the present invention is to provide a new lawn mower blade which provides in the apparatuses and methods of the prior art some of the advantages thereof, while simultaneously overcoming some of the disadvantages normally associated therewith.

Still another object of the present invention is to provide a new lawn mower blade for improving the cutting edge to produce a more efficient cutting area.

Yet another object of the present invention is to provide a new lawn mower blade which includes an elongate blade member, a first scalloped cutting edge region on one end of the blade member, a second scalloped cutting edge region on the other end, a first deflecting fin on the opposite edge of the second scalloped cutting edge region, a second deflecting fin on the opposite edge of the first scalloped cutting edge region, and a mounting means for mounting the blade member to a lawnmower.

Still yet another object of the present invention is to provide a new lawn mower blade that consistently cuts grass efficiently, cleaner, and straighter resulting in a more even cutting area.

Even still another object of the present invention is to provide a new lawn mower blade that increases the surface area of the cutting edge producing smaller clippings thereby reducing clogging of a rotary type lawnmower.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
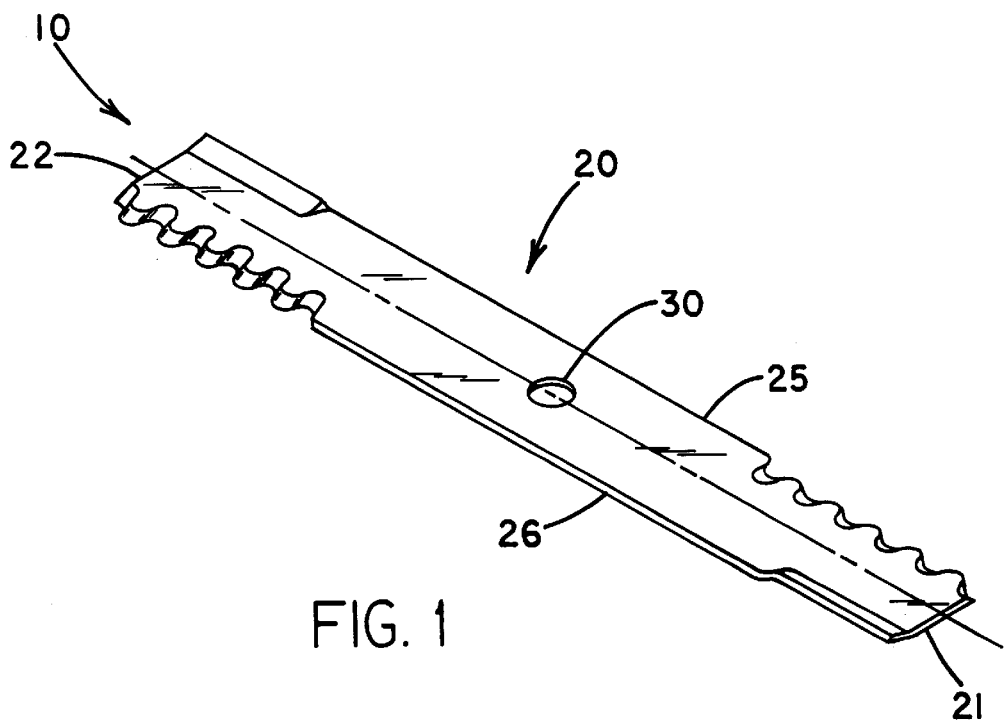
FIG. 1 is a perspective view of a new lawn mower blade according to the present invention.

With reference now to the drawings, and in particular to FIGS. 1 through 6 thereof, a new lawn mower blade embodying the principles and concepts of the present invention and generally designated by the reference numeral 10 will be described.

As best illustrated in FIGS. 1 through 6, the lawn mower blade 10 comprises an elongate blade member 20, a first scalloped cutting edge region 60 on one end of the blade member, a second scalloped cutting edge region 70 on the other end, a first deflecting fin 40 on the opposite edge of the second scalloped cutting edge region 70, a second deflecting fin 50 on the opposite edge of the first scalloped cutting edge region 60, and a mounting means for mounting the blade member 20 to a lawnmower.

Figure 2:
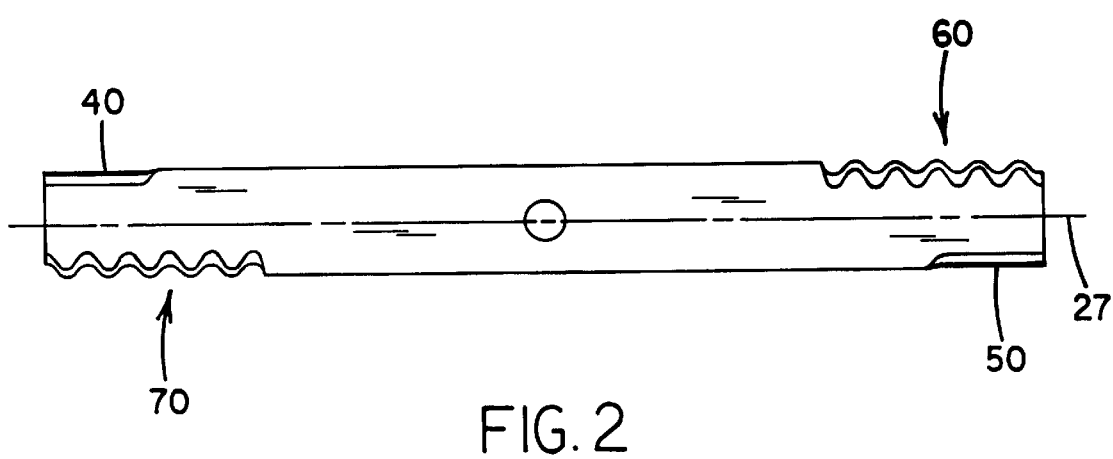
FIG. 2 is a top view of the present invention.
Figure 3:
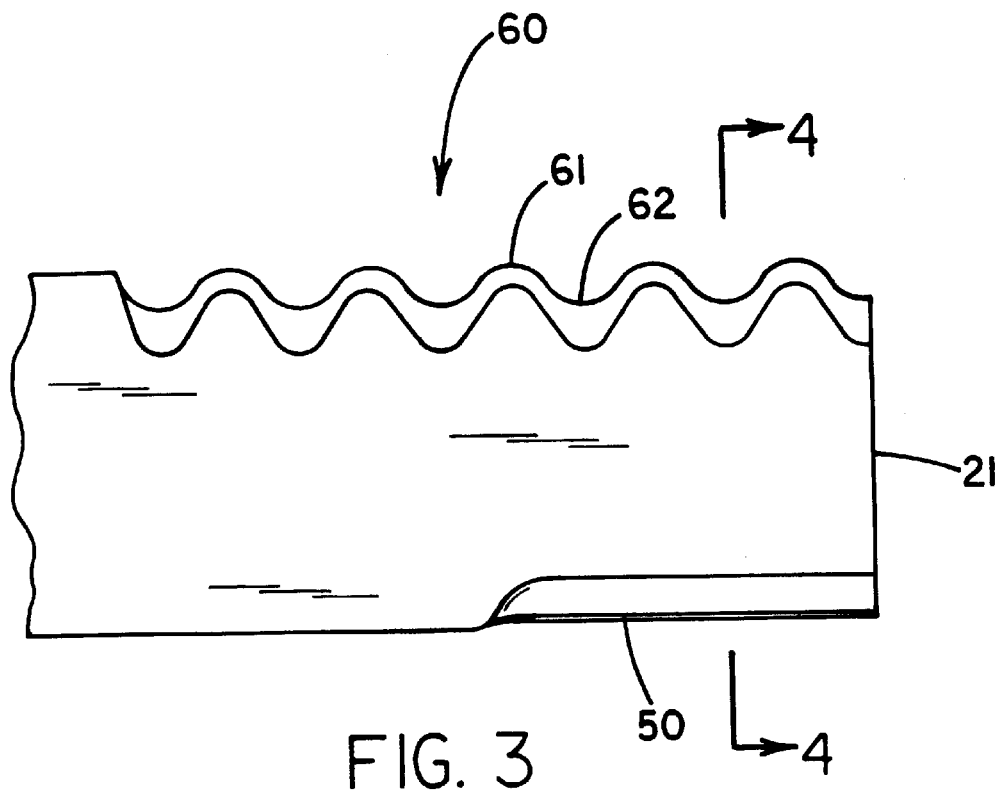
FIG. 3 is a top view of the first cutting edge region of the present invention.
Figure 4:
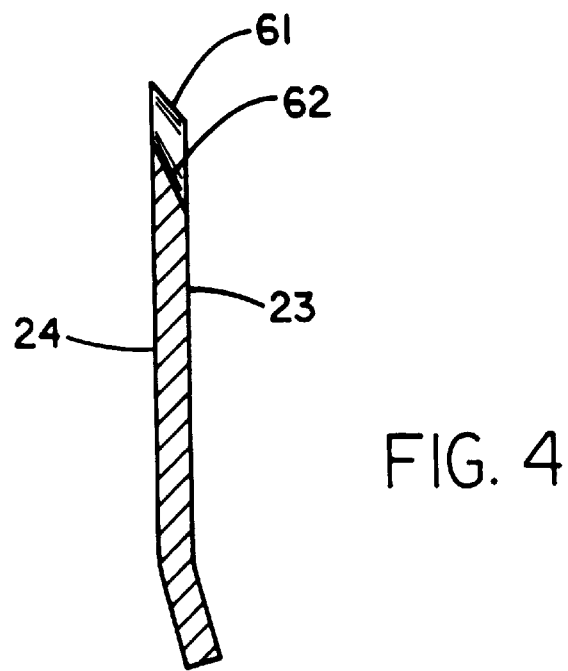
FIG. 4 is a cross sectional view taken from line 4—4 of FIG. 3.
Figure 5:
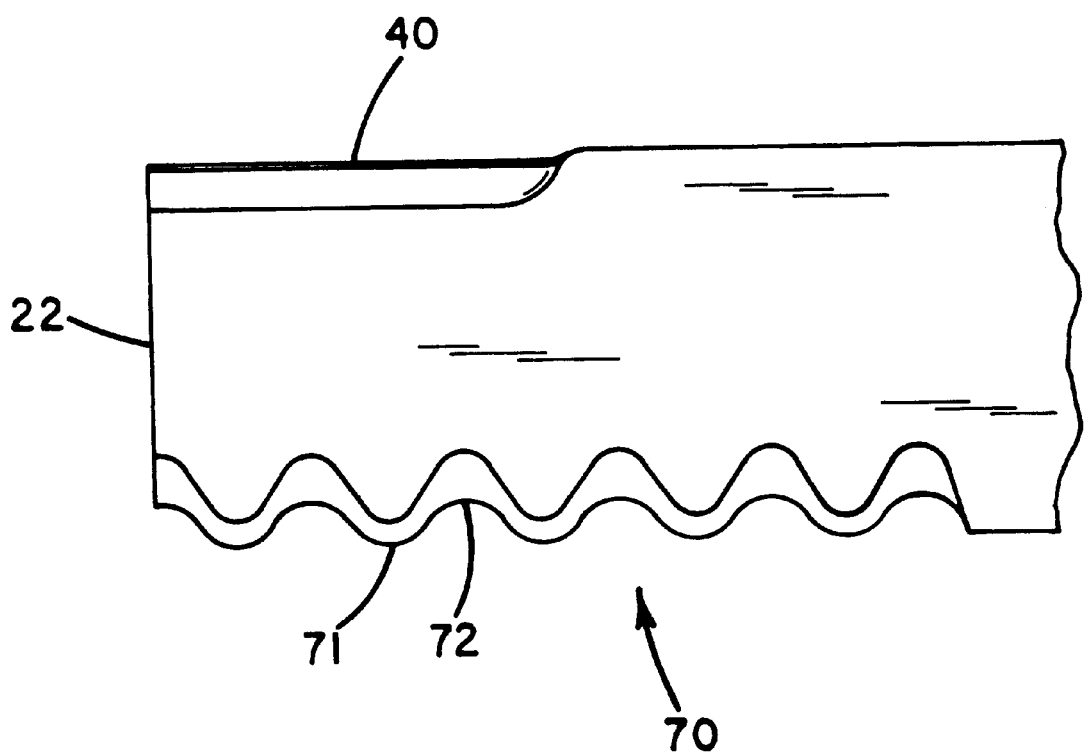
FIG. 5 is a top view of the second cutting edge region of the present invention.

The elongate blade member 20 is designed to be mounted within a housing of a rotary type lawnmower (not shown), and driven by motor to rotate horizontally about a vertical axis. The elongate blade member 20 as shown in FIGS. 1,2 and 3, has a first end 21, a second end 22, a first upper surface 23, and a second lower surface 24. Also shown in FIGS. 1,2 and 3, the first edge 25 and the second edge 26 of the blade member 20 extend between the first end 21 and the second end 22. A longitudinal axis 27 extends between the first 21 and second 22 end and is positioned between the first 25 and second 26 edge.

A mounting means, such as a mounting aperture 30, is ideally positioned at a midpoint between the first 21 and second 22 end of the blade member 20 and centrally disposed between the first 25 and second 26 edge. The mounting aperture 30 extends through the first 23 and second 24 surface of the blade member 20 for mounting to a lawnmower.

Preferably, a first deflecting fin 40 is located towards the blade member first edge 25 and positioned towards the blade member second end 22. The first deflecting fin 40 extends upwardly from the first surface 23. In a similar fashion, a second deflecting fin 50 is preferably located towards the blade member second edge 26 and positioned towards the blade member first end 21. The second deflecting fin 50 also extends upwardly from the first surface 23. The upturned fins 40, 50 aid the blade member 20 to produce a fan effect improving circulation within the housing to remove grass clippings and debris from the cutting area, while the blade member 20 is rotating about a central axis during operation of a lawnmower.

The first scalloped cutting edge region 60, preferably elongate, is located on the first edge 25 and positioned towards the first end 21 of the blade member 20. The first scalloped cutting edge region 60 extends from the first end 21 towards the blade member second end 22 with a plurality of alternating arcuate peak portions 61 and arcuate valley portions 62. As a reference, which is shown in FIGS. 1,2, and 3, the arcuate valley portions 62 are positioned closer to the horizontal axis than are the arcuate peak portions 61.

The second scalloped cutting edge region 70, preferably elongate, is located on the second edge 26 and positioned towards the second end 22 of the elongate blade member 20. The second scalloped cutting edge region 70 extends from the second end 22 towards the blade member first end 21 with a plurality of alternating arcuate peak portions 71 and arcuate valley portions 72. As a reference, which is shown in FIGS. 1,2, and 3, the arcuate valley portions 72 are positioned closer to the horizontal axis than are the arcuate peak portions 71.

Preferably, as shown in FIGS. 1,2, and 3, an arcuate peak portion 61 is located at the intersection of the blade member first edge 25 and the blade member first end 21. In addition, as shown in FIGS. 1,2, and 3, the arcuate valley portion 72 is preferably located at the intersection of the blade member second edge 26 and the blade member second end 22. In this preferred embodiment, the blade member 20 is designed to have the first scalloped cutting edge region 60 offset from the second scalloped cutting edge region 70 by having the arcuate peak portion 61 located at the first end 21 and the arcuate valley portion 72 located at the second end 22, as described above. Illustratively, if an arcuate peak portion 61 on the first edge 25 strikes an object, the arcuate valley portion 72 on the second edge 26 is protected from striking the object at the same point. The offsetting of the arcuate portions helps to prolong the sharpness of the blade member 20.

Advantageously, the alternating serration of the plurality of the arcuate portions on the first 25 and second 26 edge improves the likelihood that one of the edges 25,26 is sharp if the opposing arcuate region is dull, thereby cutting grass cleaner, straighter and more even.

Preferably, the slope of the first 60 and second 70 scalloped cutting edge region may vary between the blade member first surface 23 and the blade member second surface 24. More preferably, the run of the slopes of the arcuate valley portions 62,72 is generally longer than the run of the slopes of the arcuate peak portions 61,71. In mathematical terms, this represents that the slope value of the arcuate valley portions 62,72 is smaller than the slope value of the arcuate peak portions 61,71. Ideally, the slopes of both the arcuate peak portions 61,71 and arcuate valley portions 62,72 are uniform along the extent of the first 60 and second 70 scalloped cutting edge regions.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lawn mower blade for a rotary blade type lawn mower, comprising:

a blade member having a first end, a second end, a first surface, a second surface, a first edge, and a second edge;

mounting means for mounting said blade member to a lawn mower;

a first scalloped cutting edge region being provided on said blade member first edge;

a second scalloped cutting edge region being provided on said blade member second edge;

wherein said first and second scalloped cutting edge regions each have a plurality of alternating arcuate peak portions and arcuate valley portions;

wherein said peak portions and said valley portions of said first and second scalloped cutting edges are rounded for providing an optimal cutting edge for cutting lawns;

said peak portions having a convexity facing in an outwardly direction from the respective scalloped cutting edge;

said valley portions having a concavity facing in an outwardly direction from the respective scalloped cutting edge; said convexity and said concavity having radii of curvature being generally equal to one another for providing an optimal cutting edge for cutting lawns.

2. The lawn mower blade of claim 1, wherein said mounting means is a mounting aperture for mounting said blade member to a lawn mower, said mounting aperture being extended through said blade member between said first surface and blade member second surface, said mounting aperture being positioned at a midpoint between said blade member first end and said blade member second end.

3. The lawn mower blade of claim 1, wherein said first and second scalloped cutting edges each have a forwards edge at said second surface and a rearwards edge at said first surface, said rearwards cutting edge of each scalloped cutting edge being located closer to a longitudinal axis of blade member than the associated forwards cutting edge of the respective scalloped cutting edge, said first and second scalloped cutting edges each having a slope extending continuously from the respective rearwards edge to the respective forwards edge, said slope of each of said scalloped cutting edges extending at a first acute angle at each peak portion and a second acute angle at each valley portion with respect to said second surface of said blade member, and wherein said first acute angle being greater than said second acute angle such that the slope at each of the peak portions is steeper than the slope at each of the valley portions for providing an optimal cutting edge for cutting lawns.

4. The law mower blade of claim 1, wherein said first scalloped cutting edge region is extended from said blade member first end towards said blade member second end.

5. The lawn mower blade of claim 4, wherein a said peak portion of said first scalloped cutting edge region intersects said blade member first edge.

6. The lawn mower blade of claim 1, wherein said blade member has a longitudinal axis, said longitudinal axis being extended along a line between said blade member first end and said blade member second end, said longitudinal axis being positioned between said blade member first edge and said blade member second edge, and wherein said valley portions of said first scalloped cutting edge region being positioned closer to said blade member longitudinal axis than said peak portions of said first scalloped cutting edge.

7. The lawn mower blade of claim 1, wherein a slope of said first cutting edge region between said blade member first surface and said blade member second surface is substantially uniform along the extent of said first cutting edge region.

8. The lawn mower blade of claim 1, further comprising a first deflecting fin being located towards said blade member first edge, said first deflecting fin being extended from said blade member first surface, said first deflecting fin being positioned towards said blade member second end.

9. The lawn mower blade of claim 1, wherein said second scalloped cutting edge region has a plurality of alternating arcuate peak portions and arcuate valley portions.

10. The law mower blade of claim 9, where in said second scalloped cutting edge region is extended from said blade member second end towards said blade member first end.

11. The lawn mower blade of claim 10, wherein a said valley portion of said second scalloped cutting edge region intersects said blade member second edge.

12. The lawn mower blade of claim 9, wherein said blade member has a longitudinal axis, said longitudinal axis being extended along a line between said blade member first end and said blade member second end, said longitudinal axis being positioned between said blade member first edge and said blade member second edge, and wherein said valley portions of said second scalloped cutting edge region being positioned closer to said blade member longitudinal axis than said peak portions of said second scalloped cutting edge.

13. The lawn mower blade of claim 9, wherein the slope of said second cutting edge region between said blade member first surface and said blade member second surface is substantially uniform along the extent of said first cutting edge region.

14. The lawn mower blade of claim 1, further comprising a second deflecting fin being located towards said blade member second edge, said second deflecting fin being extended from said blade member first surface, said second deflecting fin being positioned towards said blade member first end.

15. A lawn mower blade for a rotary blade type lawn mower, comprising:

an elongate blade member having a first end, a second end, a first surface, a second surface, a first edge, a second edge, a longitudinal axis, said longitudinal axis being extended along a line between said blade member first end and said blade member second end, said longitudinal axis being positioned between said blade member first edge and said blade member second edge;

a mounting aperture for mounting said blade member to a lawn mower, said mounting aperture being extended through said blade member between said first surface and blade member second surface, said mounting aperture being positioned at a midpoint between said blade member first end and said blade member second end;

a first deflecting fin being located towards said blade member first edge, said first deflecting fin being extended from said blade member first surface, said first deflecting fin being positioned towards said blade member second end;

a second deflecting fin being located towards said blade member second edge, said second deflecting fin being extended from said blade member first surface, said second deflecting fin being positioned towards said blade member first end;

an elongate first scalloped cutting edge region being provided on said blade member first edge, said first scalloped cutting edge region being extended from said blade member first end towards said blade member second end, said first scalloped cutting edge region having a plurality of alternating arcuate peak portions and arcuate valley portions, said valley portions of said first scalloped cutting edge region being positioned closer to said blade member longitudinal axis than said peak portions of said first scalloped cutting edge, a said peak portion of said first scalloped cutting edge region intersecting said blade member first edge;

a second scalloped cutting edge region being provided on said blade member second edge, said second scalloped cutting edge region being extended from said blade member second end towards said blade member first end, said second scalloped cutting edge region having a plurality of alternating arcuate peak portions and arcuate valley portions, said valley portions of said second scalloped cutting edge region being positioned closer to said blade member longitudinal axis than said peak portions of said second scalloped cutting edge, a said valley portion of said second scalloped cutting edge region intersecting said blade member second edge;

wherein said peak portions and said valley portions of said first and second scalloped cutting edges are rounded for providing an optimal cutting edge for cutting lawns;

said peak portions having a convexity facing in an outwardly direction from the respective scalloped cutting edge;

said valley portions having a concavity facing in an outwardly direction from the respective scalloped cutting edge;

said peak portions of each having a radius of curvature being generally equal to one another;

said valley portions each having a radius of curvature being generally equal to one another;

said radii of curvature of said peak and valley portions being generally equal to one another for providing an optimal cutting edge for cutting lawns;

said first and second scalloped cutting edges each having a forwards edge at said second surface and a rearwards edge at said first surface;

said rearwards cutting edge of each scalloped cutting edge being located closer to said longitudinal axis of blade member than the associated forwards cutting edge of the respective scalloped cutting edge;

said first and second scalloped cutting edges each having a slope extending continuously from the respective rearwards edge to the respective forwards edge;

said slope of each of said scalloped cutting edges extending at a first acute angle at each peak portion and a second acute angle at each valley portion with respect to said second surface of said blade member;

said first acute angle being greater than said second acute angle such that the slope at each of the peak portions is steeper than the slope at each of the valley portions for providing an optimal cutting edge for cutting lawns;

wherein said first acute angle is less than about 50 degrees and wherein said second acute angle is less than about 30 degrees;

each of said deflecting fins having a generally rectangular configuration for providing a preferred amount of lift and deflection to lawn cuttings.

16. The lawn mower blade of claim 15, wherein said first acute angle is about 40 degrees and wherein said second acute angle is about 25 degrees.

17. The lawn mower blade of claim 1, wherein said peak portions of each have a radius of curvature being generally equal to one another, wherein said valley portions each have a radius of curvature being generally equal to one another, and wherein said radii of curvature of said peak and valley portions are generally equal to one another for providing an optimal cutting edge for cutting lawns.

* * * * *